US006336170B1

(12) United States Patent
Dean et al.

(10) Patent No.: US 6,336,170 B1
(45) Date of Patent: Jan. 1, 2002

(54) METHOD AND SYSTEM IN A DISTRIBUTED SHARED-MEMORY DATA PROCESSING SYSTEM FOR DETERMINING UTILIZATION OF SHARED-MEMORY INCLUDED WITHIN NODES BY A DESIGNATED APPLICATION

(75) Inventors: Mark E. Dean, Austin, TX (US); James Michael Magee, Fernandina Beach, FL (US); Ronald Lynn Rockhold, Austin, TX (US); Guy G. Sotomayor, Jr., San Jose, CA (US); James Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,898

(22) Filed: Oct. 13, 1998

(51) Int. Cl.$^7$ .............................................. G06F 12/00
(52) U.S. Cl. ...................................................... 711/147
(58) Field of Search ................................ 709/104, 105; 711/147, 148, 170, 171, 172, 173

(56) References Cited

U.S. PATENT DOCUMENTS

| | | | |
|---|---|---|---|
| 5,006,978 A | 4/1991 | Neches | 364/200 |
| 5,270,919 A | 12/1993 | Blake et al. | 364/401 |
| 5,450,586 A | 9/1995 | Kuzara et al. | 395/700 |
| 5,487,066 A | 1/1996 | McNamara et al. | 370/85.2 |
| 5,535,116 A | 7/1996 | Gupta et al. | 364/134 |
| 5,568,476 A | 10/1996 | Sherer et al. | 370/60 |
| 5,634,110 A | 5/1997 | Laudon et al. | 395/472 |
| 5,794,229 A | * 8/1998 | French et al. | 707/2 |
| 5,897,657 A | * 4/1999 | Hagersten et al. | 711/145 |
| 5,918,249 A | * 6/1999 | Cox et al. | 711/203 |
| 6,026,472 A | * 2/2000 | James et al. | 711/147 |
| 6,035,377 A | * 3/2000 | James et al. | 711/147 |
| 6,035,378 A | * 3/2000 | James | 711/147 |
| 6,065,099 A | * 5/2000 | Clark et al. | 711/133 |
| 6,073,225 A | * 6/2000 | James et al. | 711/202 |

* cited by examiner

Primary Examiner—Matthew Kim
Assistant Examiner—Christian P. Chace
(74) Attorney, Agent, or Firm—Richard A. Henkler; Leslie A. Van Leeuwen; Bracewell & Patterson, L.L.P.

(57) ABSTRACT

A method and system in a distributed shared-memory data processing system are disclosed having a single operating system being executed simultaneously by a plurality of processors included within a plurality of coupled processing nodes for determining a utilization of each memory location included within a shared-memory included within each of the plurality of nodes by each of the plurality of nodes. The operating system processes a designated application utilizing the plurality of nodes. During the processing, for each of the plurality of nodes, a determination is made of a quantity of times each memory location included within a shared-memory included within each of the plurality of nodes is accessed by each of the plurality of nodes.

18 Claims, 6 Drawing Sheets

METHOD AND SYSTEM IN A DISTRIBUTED SHARED-MEMORY DATA PROCESSING SYSTEM FOR DETERMINING UTILIZATION OF SHARED-MEMORY INCLUDED WITHIN NODES BY A DESIGNATED APPLICATION

CROSS-REFERENCE TO RELATED APPLICATIONS

The present invention is related to the subject matter of co-pending patent application Ser. No. 09/146,391 entitled "METHOD AND SYSTEM IN A DISTRIBUTED SHARED-MEMORY DATA PROCESSING SYSTEM FOR DETERMINING UTILIZATION OF NODES BY EACH EXECUTED THREAD", assigned to the assignee herein named, filed on Sep. 4, 1998, and incorporated herein by reference.

BACKGROUND OF THE INVENTION

1. Technical Field

The present invention relates to data processing systems and, in particular, to a distributed shared-memory data processing system for determining utilization of shared-memory included within each of a plurality of coupled processing nodes. Still more particularly, the present invention relates to a method and system in a distributed shared-memory data processing system for determining utilization of shared-memory included within each of a plurality of coupled processing nodes by a designated application.

2. Description of the Related Art

One type of data processing system is a uniprocessor system which has only one central processing unit (CPU) which executes an operating system. This type of system is typically utilized in older computer systems.

Another type of data processing system is a multiprocessor system which has more than one CPU. A particular type of multiprocessor system of a symmetric multiprocessor system (SMP). An SMP system includes a plurality of processors each having equal access to memory and input/output (I/O) devices shared by the processors. In an SMP system, a single operating system is executed simultaneously by the plurality of processors. The operating system can divide a software application into separate processes that can execute simultaneously on the processors in the system. In this manner, because different processes of the application can simultaneously be executed, the application can be executed in an SMP system faster than it could be executed in a uniprocessor system.

A multiprocessor system must have a method and system for keeping track of the different processes being executed by the different processors. The multiprocessor system utilizes threads to represent the separately dispatchable units of these processes. Threads are utilized by the operating system to keep track of the location and status of each unit of work executing on the plurality of processors.

Multiple SMP systems can be clustered together to form a more powerful data processing system. A clustered SMP system includes multiple nodes which are coupled together via an interconnection network. Each node includes one or more processors and a shared-memory which can be accessed equally by the processors of the node.

One method and system for maintaining a cluster of multiple SMP systems is called distributed shared-memory system. A distributed shared-memory system is also called a non-uniform memory access (NUMA) system. A NUMA system includes multiple nodes as described above. Each processor in a node in the NUMA system can access the shared-memory in any of the other nodes in the system. Therefore, the memory access may be non-uniform across the nodes.

In a symmetric multiprocessor (SMP) system, a single operating system is simultaneously executed by a plurality of interconnected processors. The operating system selects threads to dispatch to various processors within the SMP data processing system. A part of the operating system executing on a first processor may select a particular thread to process. The first processor may decide that the selected thread should be executed by any of the other processors in the data processing system. However, typically, the first processor will decide that the selected thread will be executed by the first processor. In the event a processor other than the first processor is selected to execute the thread, the first processor notifies the other processor that the other processor has been selected to execute the thread. The other processor then selects this thread. The other processor dispatches and executes the thread. In this manner, a processor in the system may select any of the processors in the system to execute a thread. The processor selected to execute a thread then dispatches and executes that thread.

A user may desire to monitor and tune, or optimize, the performance of an application executing on a NUMA system. In order to tune the application, it would be helpful to be able to obtain runtime load balancing information regarding the accessing of shared-memory by each node within the NUMA system. An application's locality access ratio is data which is also useful for determining the quality of the performance of the application within the particular system. The locality access ratio is the ratio of memory references made by the application that are to the local node's memory versus the total references made by that node including both local and remote memory accesses.

A local memory access is a reference from a processor in a first node to a memory location included within the shared-memory included within the first node. A remote memory reference is a reference from a processor in a first node to a memory location included within the shared-memory included within a second node. Numerous remote memory references result in poor performance for the particular application.

Therefore a need exists for a method and system in a data processing system for determining utilization of shared-memory included within each of a plurality of coupled processing nodes.

SUMMARY OF THE INVENTION

It is therefore one object of the present invention to provide an improved data processing system.

It is another object of the present invention to provide a method and system in a distributed shared-memory data processing system for determining a utilization of shared-memory included within each of a plurality of coupled processing nodes.

It is yet another object of the present invention to provide a method and system in a distributed shared-memory data processing system for determining a utilization of shared-memory included within each of a plurality of coupled processing nodes by a designated application.

The foregoing objects are achieved as is now described. A method and system in a distributed shared-memory data processing system are disclosed having a single operating system being executed simultaneously by a plurality of processors included within a plurality of coupled processing nodes for determining a utilization of each memory location included within a shared-memory included within each of the plurality of nodes by each of the plurality of nodes. The operating system processes a designated application utilizing the plurality of nodes. During the processing, for each of the plurality of nodes, a determination is made of a quantity of times each memory location included within a shared-memory included within each of the plurality of nodes is accessed by each of the plurality of nodes.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF ILLUSTRATIVE EMBODIMENT

Figure 1:
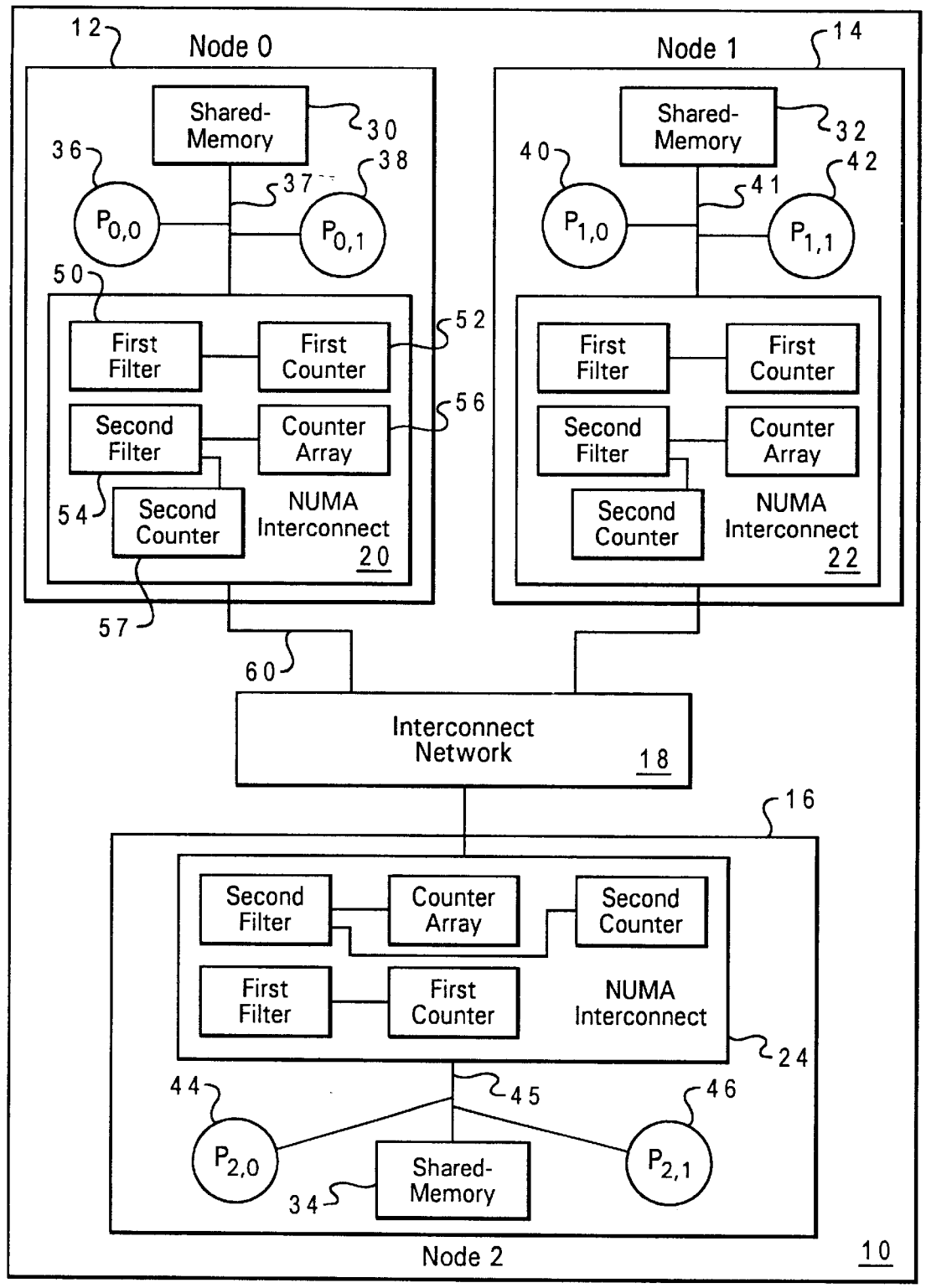
FIG. 1 depicts a block diagram of a distributed shared-memory data processing system embodying the present invention.

A preferred embodiment of the present invention and its advantages are better understood by referring to FIGS. 1–6 of the drawings, like numerals being used for like and corresponding parts of the accompanying drawings.

The method and system of the present invention may be utilized in a distributed shared-memory data processing system to determine utilization of each memory location included within a shared-memory in each node of the system by a designated application. In this manner, for the designated application, data is maintained which indicates the quantity of local and remote memory accesses made by the application. The remote memory access data is maintained according for each memory location and for each node. Therefore, a quantity of times each remote node accessed each memory location within a node's shared-memory is maintained. The data is gathered at runtime.

Once this data is determined, it may be utilized to optimize, or tune, the application. For example, for memory locations which were accessed large quantity of times by a remote node, the memory location may be copied or migrated to that remote node's shared memory. In this manner, memory locations having a high remote node access could be copied so that the data is close to the node making the reference, thus reducing the remote memory references for the application. Those skilled in the art will recognize that preferably an entire page of memory may be copied instead of copying the single memory location.

In addition, the accumulated data regarding quantity of local and remote memory accesses may be utilized to determine a locality access ratio for the designated application. The ratio indicates how well suited the application's current design is for execution within a NUMA system.

Each node's interconnect includes two filters. The first filter is utilized to pass only those transactions which are generated on a local processor, are associated with the designated application, and which are also associated with a shared-memory address which is included within the shared-memory of this particular node, i.e. a local memory access. The second filter is utilized to pass only those transactions which are generated on a remote node's processor, are associated with the designated application, and which are also associated with a shared-memory address which is included within the shared-memory of this particular node, i.e. a remote memory access to this node.

The first filter is coupled to a first counter to count each transaction passed by the first filter. In this manner, the first counter maintains the quantity of times the node including this first filter accesses its own shared-memory.

The second filter is coupled to a counter array and a second counter. The counter array includes a plurality of counters. For a particular node, the counter array includes a plurality of columns, each associated with one of the other nodes in the system. The array also includes a plurality of rows, each associated with a memory location which is within the shared-memory in this particular node. Therefore, each counter in the array is associated both with a node and with a shared-memory address. In this manner, the counter array maintains the quantity of times each remote node accessed the shared-memory in this particular node. The second counter array maintains the quantity of times a remote node accessed each page of memory in the shared-memory in this particular node.

The first counter, second counter, and counter arrays may be utilized to determine a means for optimizing the performance of the designated application. For example, the sum of all of the first counters divided by the sum of all first and second counters yields the designated application's local access ratio, a measure of how well-behaved the application is with respect to execution on a NUMA system. The higher the local access ratio is, the better the performance of the application, with a ratio of one being ideal.

In addition, the sum of each row in all counter arrays identifies the quantity of times each page of memory was accessed remotely. This information can be used to select those pages with the highest counts and then to tune the application so as to reduce the number of cross-node, or remote node, references. Having the individual counts by page maximizes the returns on the time invested in tuning.

FIG. 1 depicts a block diagram of a distributed shared-memory data processing system 10 embodying the present invention. System 10 includes a plurality processing nodes 12, 14, and 16 which are coupled together utilizing an interconnect network 18.

Each node 12, 14, and 16 includes a NUMA interconnect which includes filters and counters. For example, node 12 includes interconnect 20. Node 14 includes interconnect 22. Node 16 includes interconnect 24. Preferably, each interconnect 20, 22, or 24 is a SYNFINITY™ NUMA and SYNFINITY™ NET, which can be obtained from Fujitsu System Technologies of Campbell, Calif.

Each interconnect 20, 22, and 24 has been modified by adding a first filter coupled to a first counter, and a second counter and counter array coupled to a second filter. For example, node 12 includes first filter 50 coupled to first counter 52, and second filter 54 coupled to both counter array 56 and second counter 57. The filters and counters of node 12 are described in more detail in FIG. 2. Those skilled in the art will recognize that the filters, counters, and other components of FIG. 2 may be implemented in all other nodes in system 10.

The filters and counters are utilized to count the quantity of times a transaction is passed by either the first or second filters. A transaction is passed by a node's first filter if the transaction is a memory transaction which is a local memory access. A transaction is passed by a node's second filter if the transaction is a memory transaction which is a remote memory access.

Each node also includes a plurality of processors and shared-memory coupled together utilizing a system bus. Node 12 includes two processors 36, 38 and shared-memory 30 utilizing system bus 37. Node 14 includes two processors 40, 42 and shared-memory 32 utilizing system bus 41. Node 16 includes two processors 44, 46 and shared-memory 34 utilizing system bus 45.

Each processor in a node is granted equal access to the shared-memory in that node. A local memory access occurs when a processor accesses the shared-memory in the node which includes that processor. The shared-memory in the node is called the local shared-memory.

Each processor in a node may also access the shared-memory which is located in a node other than the node which includes that processor. A remote memory access occurs when a processor accesses the shared-memory in a node other than the one which includes that processor.

For example, when either processor 36 or 38 accesses shared-memory 30, it is a local memory access. When either processor 36 or 38 accesses either shared-memory 32 or 34, it is a remote memory access.

Figure 2:
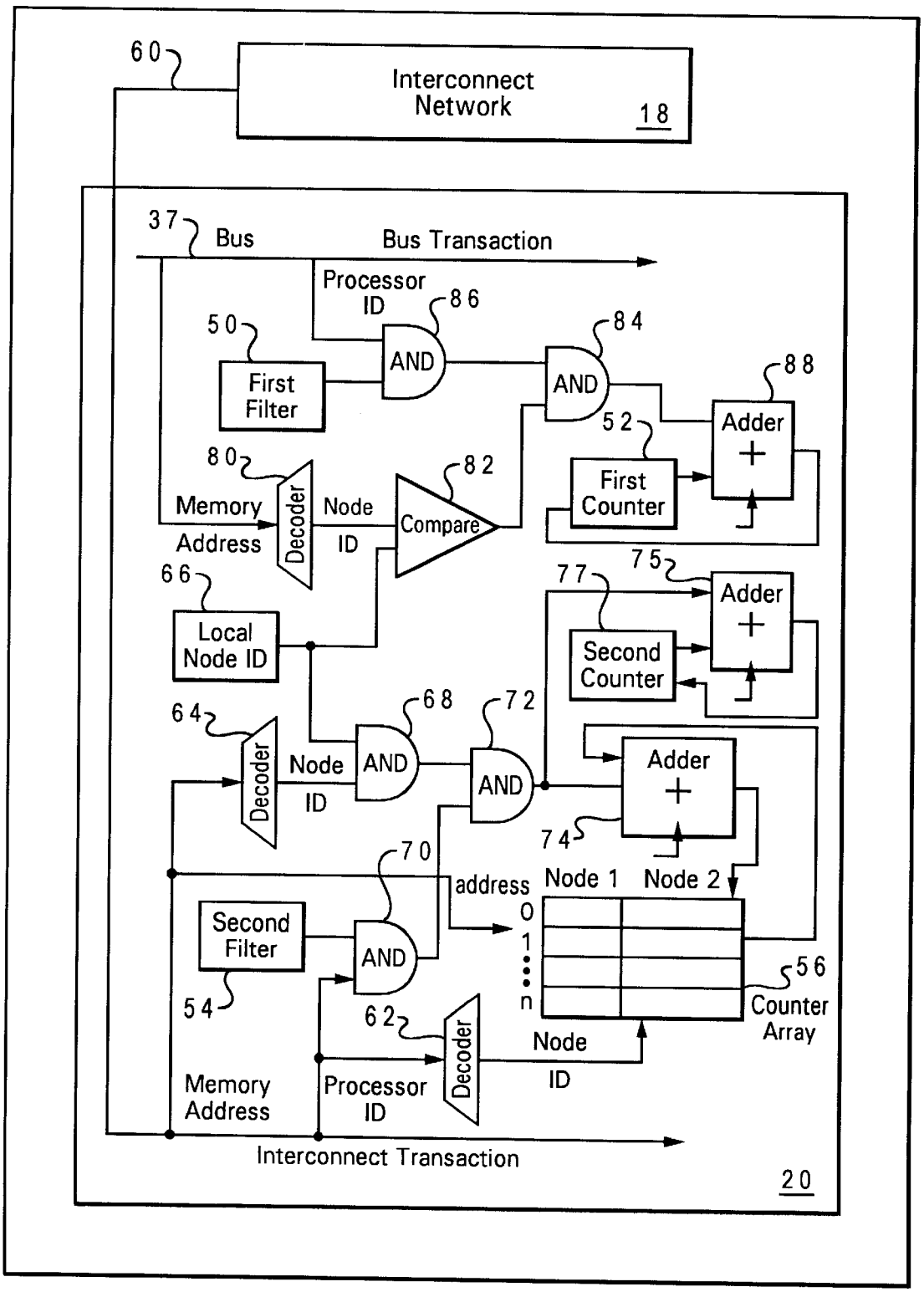
FIG. 2 illustrates a high-level block diagram of filter and counter hardware included within FIG. 1 in accordance with the method and system of the present invention.

FIG. 2 illustrates a high-level block diagram of filter and counter hardware included within FIG. 1 in accordance with the method and system of the present invention. FIG. 2 represents the filter and counter hardware in interconnect 20 shown in FIG. 1.

As each transaction is passed through interconnect network 18, it is monitored by interconnects 20, 22, and 24. Interconnect 20 is coupled to interconnect network 18 via interconnect line 60. Interconnect transactions are received by interconnect 20 utilizing interconnect line 60. Transactions generated by nodes 14 and 16, thus, can be monitored by node 12 utilizing interconnect line 60. Each interconnect transaction includes an associated processor identifier and an associated memory location which this transaction needs to access.

The processor identifier is received within decoder 62. Each processor identifier includes information regarding the node which includes that particular processor. Decoder 62 determines the processor associated with the received transaction and determines the node which includes that processor. Decoder 62 then outputs the node identifier which identifies the determined node. The node identifier is input into counter array 56 to select the column of counter array 56 associated with the determined node.

The memory address of the shared-memory which this transaction must access is also included in the transaction received via line 60. Decoder 64 receives the memory address associated with the transaction and decodes it to determine a node identifier to which this address is local. The local node identifier 66, the identifier for node 0, is ANDed utilizing AND gate 68. The memory address is used to select a particular row of counter array 56. In this manner, the memory address associated with this transaction which is included within shared-memory 30 is determined and utilized to select a particular counter within counter array 56.

Second filter 54 is set as described below to filter out all transactions except those associated with the designated application. The output of second filter 54 and the processor identifier are input into AND gate 70. The output of AND gate 70 is input into AND gate 72 along with the output of AND gate 68. The output of AND gate 72 is input into ADDER 74 which is utilized to increment the counter selected in counter array 56. The output of AND gate 72 is also input into ADDER 75 which is utilized to increment the second counter 77. Second counter 77 maintains a total quantity of times the shared-memory included in this node was accessed remotely by any remote node. Counter array 56 maintains a quantity of times the shared-memory included in this node was accessed by each remote node. The value of the second counter represents the total quantity of remote accesses. Counter array 56 maintains the data on a per node basis.

Transactions are also passed through system bus 37 among processors, shared-memory, and interconnect in each node. Bus transactions generated locally by node 12 also include an associated processor identifier and an associated memory location which this transaction needs to access. The memory address for these bus transactions are received within decoder 80. Decoder 80 determines the node associated with the received transaction to which the memory is local. Decoder 80 then outputs the node identifier which identifies the memory's determined node. The node identifier is input into comparator 82. Comparator 82 compares the local node identifier output from local node identifier 66 with the output of decoder 80. When the two node identifiers are the same, comparator outputs a logical one which is received by AND gate 84.

First filter 50 is set as described below to filter out all transactions except those associated with the designated application. The output of first filter 50 and the processor identifier associated with this bus transaction are input into AND gate 86. The output of AND gate 86 is input into AND gate 84. The output of AND gate 84 is input into ADDER 88 which is utilized to increment first counter 52.

In this manner, first counter 52 is incremented when a bus transaction is received which is associated with the designated application and also associated with the local node. Therefore, all local node shared-memory accesses made by the designated application are counted.

A counter within counter array 56 and the second counter 77 are incremented when a interconnect transaction is received which is associated with the designated application and also associated with any one of the remote nodes. Therefore, all remote node shared-memory accesses made by the designated application are also counted. The counter which is incremented is selected by determining which node generated the transaction making the remote memory access. The counter is also associated with the particular memory location within shared-memory 30 which is to be accessed.

For example, first filter 50 determines if a bus transaction associated with the designated application needs to access the local shared-memory 30. If a bus transaction associated with the designated application accesses the local shared-memory 30, first counter 52 is incremented. Second filter 64 determines if an interconnect transaction which is associated with the designated application needs to access the local shared-memory 30. If an interconnect transaction associated with the designated application does need to access the local shared-memory 30, it is determined which node generated the transaction as well as which memory location within shared-memory 30 is to be accessed. The counter associated with both the node which generated the transaction and the memory location within shared-memory 30 to be accessed is then incremented along with second counter 77.

Figure 3:
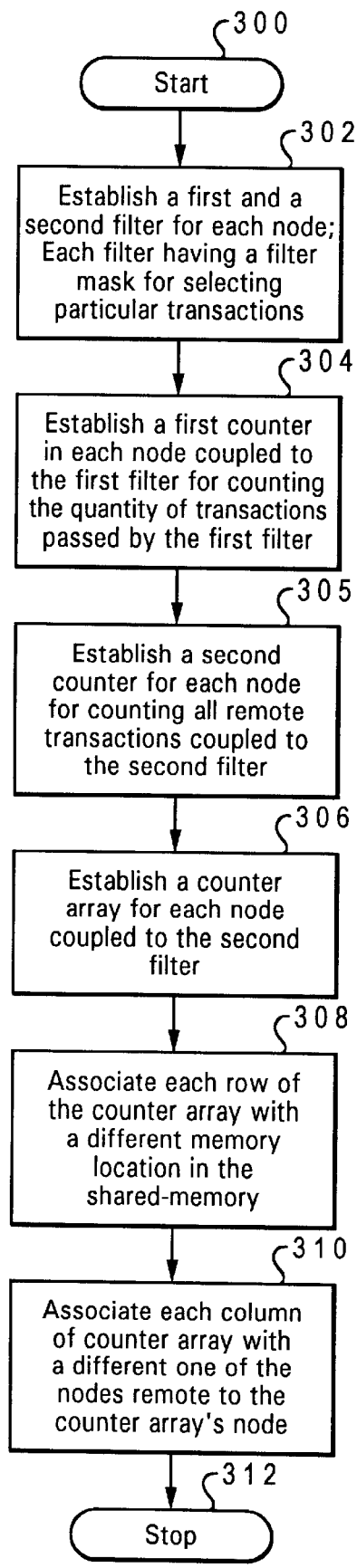
FIG. 3 is a high level flow chart illustrating the establishment of first and second filters, a first counter, a second counter, and an array of counters within each node of FIG. 1 in accordance with the method and system of the present invention.

FIG. 3 is a high level flow chart illustrating the establishment of first and second filters, a first counter, a second counter, and an array of counters within each node of FIG. 1 in accordance with the method and system of the present invention. The process starts as depicted at block 300 and thereafter passes to block 302 which illustrates the establishment of a first and a second filter for each node. Each filter has a filter mask for selectively passing particular transactions through the filter. Next, block 304 depicts the establishment of a first counter in each node which is coupled to the first filter. The first counter accumulates the quantity of times a selected transaction was passed by the first filter. Thereafter, block 305 depicts the establishment of a second counter for each node for counting all remote transactions. The second counter is coupled to the second filter. The process then passes to block 306 which illustrates the establishment of a counter array for each node. The counter array is coupled to the second filter. Block 308, then, depicts the association of each row of the counter array with a different memory location in the shared-memory local to the node including this counter array. Next, block 310 illustrates the association of each column of the counter array with a different one of the nodes which are remote to the node which includes this counter array. In this manner, the counter array is an array of counters which includes a counter associated with both a remote node and an address included within the local shared-memory. The process then terminates as illustrated at block 312.

Figure 4:
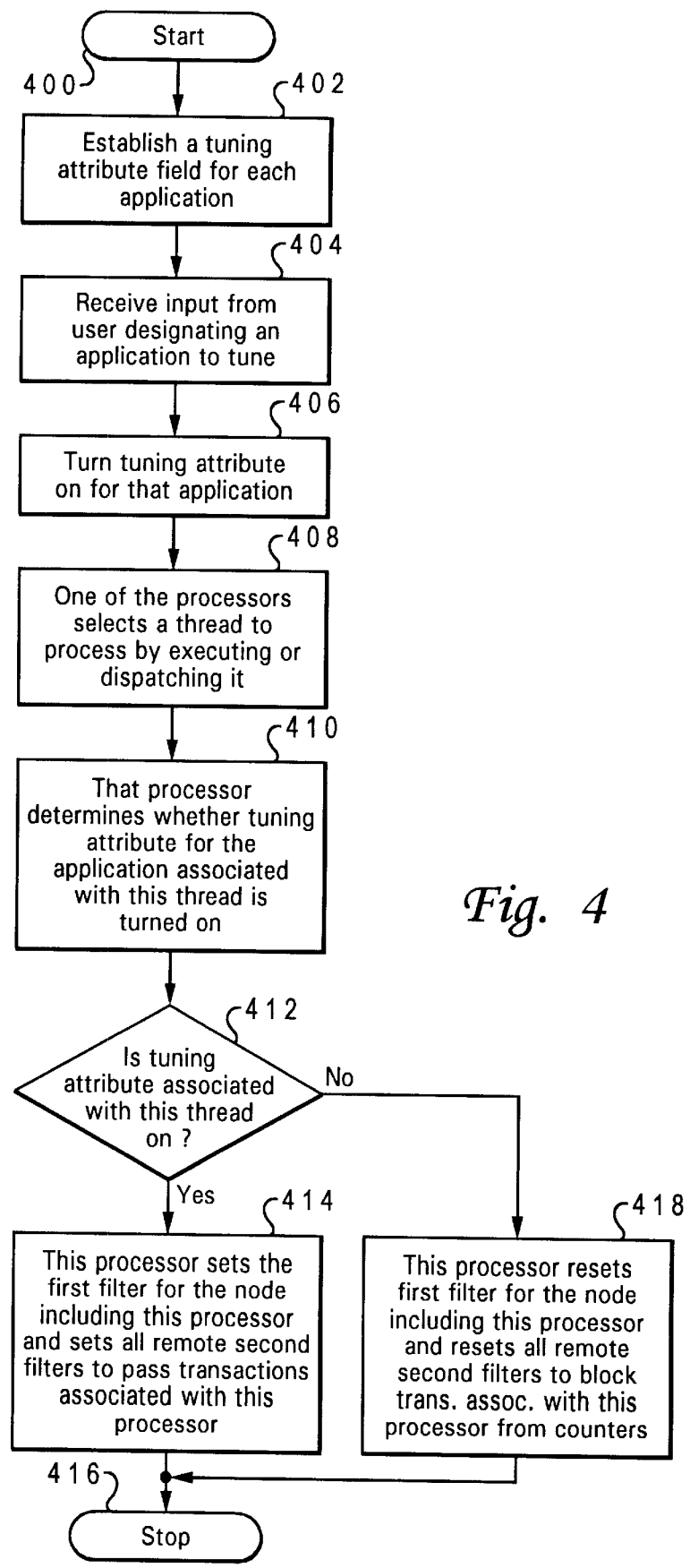
FIG. 4 is a high level flow chart depicting the setting of the first and second filters in an appropriate manner to filter out all but selected ones of a plurality of transactions in a distributed shared-memory data processing system in accordance with the method and system of the present invention.

FIG. 4 is a high level flow chart depicting the setting of the first and second filters in an appropriate manner to filter out all but selected ones of a plurality of transactions in a distributed shared-memory data processing system in accordance with the method and system of the present invention. The process starts as depicted at block 400 and thereafter passes to block 402 which illustrates the establishment of a tuning attribute field for each process or application executing within system 10. Next, block 404 depicts the receipt of input from a user designating one of the applications to be tuned. Thereafter, block 406 illustrates the turning on of the tuning attribute on for the designated application. Thereafter, the process passes to block 408 which depicts a selection by one of the processors included within system 10 of a thread to process by executing or dispatching the thread. Next, block 410 illustrates the one of the processors determining whether the tuning attribute associated with the designated application has been turned on.

Block 412, then, illustrates a determination of whether or not the turning attribute is turned on for this thread. If a determination is made that the tuning attribute is turned on, the process passes to block 414 which depicts the one of the processors setting the first filter in its own local node and the setting of all remote second filters in all remote nodes to pass only those transactions which are associated with this one of the processors.

Referring again to block 412, if a determination is made that the tuning attribute associated with this thread is turned off, the process passes to block 418 which illustrates the one of the processors resetting the first filter in its local node and the resetting of all remote second filters in all remote notes to block transactions which are associated with this one of the processors. The process terminates as depicted by block 416.

Figure 5:
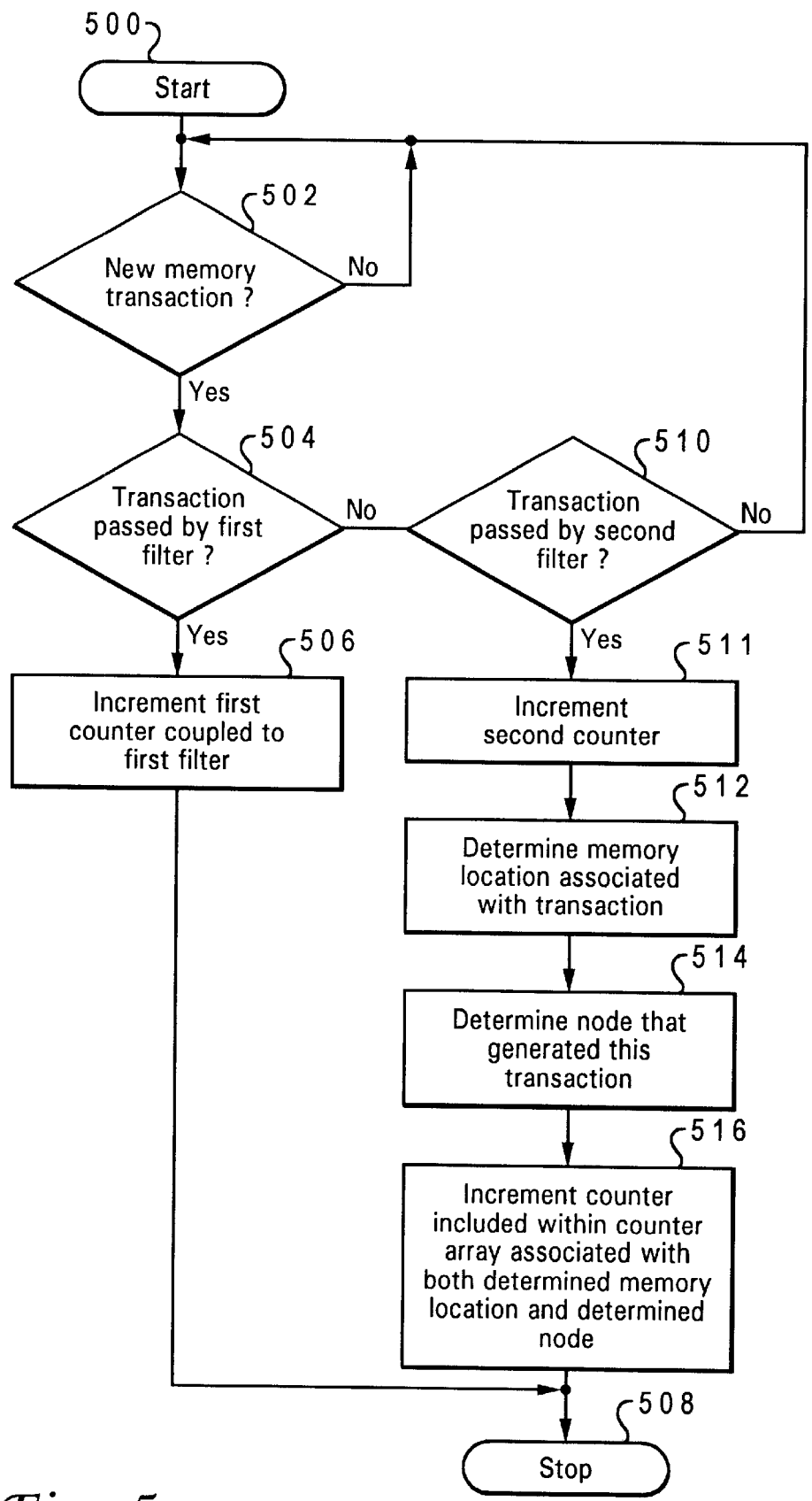
FIG. 5 is a high level flow chart illustrating the determination of a quantity of times selected ones of a plurality of transactions accessed shared-memory in a particular node in a distributed shared-memory data processing system in accordance with the present invention.

The process of FIG. 5 is executed within each node in system 10. FIG. 5 is a high level flow chart illustrating the determination of a quantity of times selected ones of a plurality of transactions accessed shared-memory in a particular node in a distributed shared-memory data processing system in accordance with the present invention. The process starts as depicted at block 500 and thereafter passes to block 502 which illustrates a determination of whether or not a new memory transaction has been received. If a determination is made that a new memory transaction has not been received, the process loops back to block 502. If a determination is made that a new memory transaction has been received, the process passes to block 504 which depicts a determination is whether or not the received transaction was passed through the first filter in this node in which the process of FIG. 5 is executing. If a determination is made that the received transaction was passed by the first filter in this node, the process passes to block 506 which illustrates the first counter coupled to the first filter being incremented. The process then terminates as depicted at block 508.

Referring again to block 504, if a determination is made that the received transaction was not passed by the first filter in this node, the process passes to block 510 which depicts a determination of whether or not the received transaction was passed by the second filter in this node in which the process of FIG. 5 is executing. If a determination is made that the received transaction was not passed by the second filter in this node, the process passes back to block 502 to await another transaction.

Referring again to block 510, if a determination is made that the received transaction was passed by the second filter in this node, the process passes to block 511 which illustrates the incrementing of the second counter. The process then passes to block 512 which depicts the determination of a memory location associated with this transaction. Next, block 514 illustrates a determination of which node includes the processor identifier associated with this transaction. The process then passes to block 516 which illustrates the incrementing of the counter included within the counter array associated with both the determined memory location and the determined node. The process then terminates as depicted at block 508.

Figure 6:
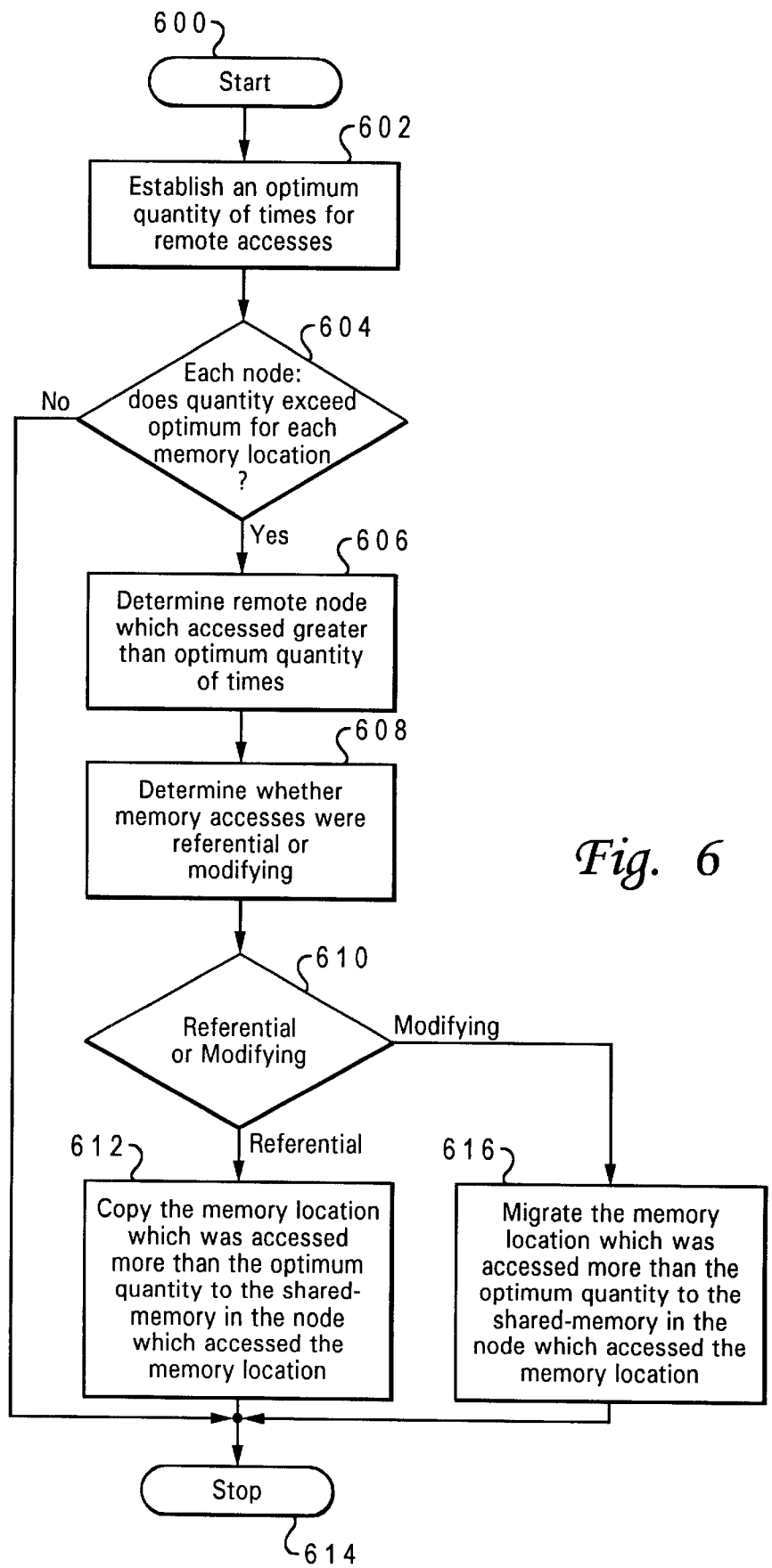
FIG. 6 is a high level flow chart depicting the determination of whether memory locations should be copied to shared-memory in another node in a distributed shared-memory data processing system in accordance with the present invention.

FIG. 6 is a high level flow chart depicting the determination of whether memory locations should be copied to shared-memory in another node in a distributed shared-memory data processing system in accordance with present invention. The process starts as illustrated at block 600 and thereafter passes to block 602 which depicts the establishment of an optimum quantity of times for remote memory accesses. The process then passes to block 604 which illustrates a determination of whether or not the optimum quantity has been exceeded. This determination is made within each node for each memory location included within that node's shared-memory. If a determination is made that the optimum quantity has not been exceeded for a particular memory location, the process then terminates as depicted at block 614.

Referring again to block 604, if a determination is made that the optimum quantity has been exceeded for a particular memory location, the process passes to block 606 which depicts a determination of which remote node caused the remote accesses to this particular memory location which exceeded to optimum quantity of time. Next, block 608 illustrates a determination of whether the memory accesses were referential read-only accesses or modifying read/write accesses. The process then passes to block 610 which depicts a determination of whether the accesses were referential or modifying. If a determination is made that the accesses were referential, the process passes to block 612 which illustrates the copying, or replicating, of the particular memory location which was accessed more than the optimum quantity of times. The memory location is copied to the shared-memory included within the node which accessed the memory location greater than the optimum quantity of times. Those skilled in the art will recognize that it may be more efficient to copy multiple memory locations which include the particular memory location. For example, an entire page of memory may be copied instead of copying a single memory location. The process then terminates as depicted at block 614.

Referring again to block 610, if a determination is made that the accesses were modifying, the process passes to block 616 which depicts the migrating of the particular memory location which was accessed more than the optimum quantity of times. The memory location is migrated to the shared-memory included within the node which accessed the memory location greater than the optimum quantity of times. Those skilled in the art will also recognize that it may be more efficient to migrate multiple memory locations which include the particular memory location. For example, an entire page of memory may be migrated instead of migrating a single memory location. The process then terminates as depicted at block 614.

While a preferred embodiment has been particularly shown and described, it will be understood by those skilled in the art that various changes in form and detail may be made therein without departing from the spirit and scope of the present invention.

What is claimed is:

1. A method in a distributed shared-memory data processing system having a single operating system being executed simultaneously by a plurality of processors included within a plurality of coupled processing nodes for determining utilization of each memory location included within a shared-memory by remote ones of said plurality of nodes, said method comprising the steps of:

said operating system processing a designated application utilizing said plurality of nodes; and during said processing, for each of said plurality of nodes, determining a quantity of times each memory location included within a shared-memory included within said each of said plurality of nodes is accessed by all other ones of said plurality of nodes, wherein a separate quantity is determined for each one of said all other ones of said plurality of nodes.

2. The method according to claim 1, further comprising the steps of:

for a first one of said plurality of nodes, establishing a first array of counters including a first plurality of rows and a first plurality of columns of counters;

associating each one of said first plurality of columns with a different one of said all other ones of said plurality of nodes, and associating each one of said first plurality of rows of counters with a different one of a plurality of addresses included within a shared-memory which is located in said first one of said plurality of nodes within which said first array of counters is located, wherein each counter included in said first array is associated with one of said plurality of nodes and one of said plurality of addresses;

for a second one of said plurality of nodes, establishing a second array of counters including a second plurality of rows and a second plurality of columns of counters; and associating each one of said second plurality of columns with a different one of said all other ones of said plurality of nodes, and associating each one of said second plurality of rows of counters with a different one of a plurality of addresses included within a shared-memory which is located in said second one of said plurality of nodes within which said second array of counters is located, wherein each counter included in said second array is associated with one of said plurality of nodes and one of said plurality of addresses.

3. The method according to claim 2, further comprising the step of determining if said quantity of times each memory location included within a shared-memory included within each of said plurality of nodes was accessed by each remote one of said plurality of nodes exceeded a particular quantity of times for a shared-memory included within each of said plurality of nodes.

4. The method according to claim 3, further comprising the step of in response to a determination that said quantity of times said each memory location included within a shared-memory included within said each of said plurality of nodes was accessed by each remote one of said plurality of nodes exceeded said particular quantity of times, copying said each memory location which was accessed greater than said particular quantity of times to a shared-memory included within a remote one of said plurality of nodes.

5. The method according to claim 4, further comprising the step of copying said each memory location which was accessed greater than said particular quantity of times to a shared-memory included within a remote one of said plurality of nodes which accessed said each memory location said particular quantity of times.

6. The method according to claim 1, wherein said application includes a plurality of transactions, each of said plurality of transactions associated with a memory location and one of said plurality of nodes, further comprising the steps of:

each of said plurality of nodes filtering said plurality of transactions utilizing a first filter to pass only a first plurality of said plurality of transactions to a first counter; and each of said plurality of nodes filtering said plurality of transactions utilizing a second filter to pass only a second plurality of said plurality of transactions to a counter array.

7. The method according to claim 6, wherein the step of each of said plurality of nodes filtering said plurality of transactions utilizing a first filter to pass only a first plurality of said plurality of transactions to a first counter, further comprises the steps of:

within each of said plurality of nodes, determining if one of said plurality of transactions executes a local memory access with respect to said each of said plurality of nodes; and in response to a determination that said one of said plurality of transactions executes a local memory access with respect to said each of said plurality of nodes, said first filter passing said one of said plurality of transactions to said first counter.

8. The method according to claim 7, wherein the step of each of said plurality of nodes filtering said plurality of transactions utilizing a second filter to pass only a second plurality of said plurality of transactions to a counter array, further comprises the steps of:

within each of said plurality of nodes, determining if one of said plurality of transactions executes a remote memory access with respect to said each of said plurality of nodes; and in response to a determination that said one of said plurality of transactions executes a remote memory access with respect to said each of said plurality of nodes, said second filter passing said one of said plurality of transactions to said second counter, wherein said one of said plurality of transactions is said second of said plurality of transactions.

9. The method according to claim 8, further comprising the step of in response to said first filter passing said one of said plurality of transactions to said first counter, incrementing said first counter.

10. A distributed shared-memory data processing system having a single operating system being executed simultaneously by a plurality of processors included within a plurality of coupled processing nodes for determining utilization of each memory location included within a shared-memory by remote ones of said plurality of nodes by each of said plurality of nodes, comprising:

means for said operating system processing a designated application utilizing said plurality of nodes; and means for during said processing, for each of said plurality of nodes, determining a quantity of times each memory location included within a shared-memory included within said each of said plurality of nodes is accessed by all other ones of said plurality of nodes, wherein a separate quantity is determined for each one of said all other ones of said plurality of nodes.

11. The system according to claim 10, further comprising:

for a first one of said plurality of nodes, means for establishing a first array of counters including a first plurality of rows and a first plurality of columns of counters;

means for associating each one of said first plurality of columns with a different one of said all other ones of said plurality of nodes, and associating each one of said first plurality of rows of counters with a different one of a plurality of addresses included within a shared-memory which is located in said first one of said plurality of nodes within which said first array of counters is located, wherein each counter included in said first array is associated with one of said plurality of nodes and one of said plurality of addresses;

for a second one of said plurality of nodes, means for establishing a second array of counters including a second plurality of rows and a second plurality of columns of counters; and means for associating each one of said second plurality of columns with a different one of said all other ones of said plurality of nodes, and associating each one of said second plurality of rows of counters with a different one of a plurality of addresses included within a shared-memory which is located in said second one of said plurality of nodes within which said second array of counters is located, wherein each counter included in said second array is associated with one of said plurality of nodes and one of said plurality of addresses.

12. The system according to claim 11, further comprising means for determining if said quantity of times each memory location included within a shared-memory included within each of said plurality of nodes was accessed by each remote one of said plurality of nodes exceeded a particular quantity of times for a shared-memory included within each of said plurality of nodes.

13. The system according to claim 12, further comprising means responsive to a determination that said quantity of times said each memory location included within a shared-memory included within said each of said plurality of nodes was accessed by each remote one of said plurality of nodes exceeded said particular quantity of times, for copying said each memory location which was accessed greater than said particular quantity of times to a shared-memory included within a remote one of said plurality of nodes.

14. The system according to claim 13, further comprising means for copying said each memory location which was accessed greater than said particular quantity of times to a shared-memory included within a remote one of said plurality of nodes which accessed said each memory location said particular quantity of times.

15. The system according to claim 10, wherein said application includes a plurality of transactions, each of said plurality of transactions associated with a memory location and one of said plurality of nodes, comprising:

means for each of said plurality of nodes filtering said plurality of transactions utilizing a first filter to pass only a first plurality of said plurality of transactions to a first counter; and means for each of said plurality of nodes filtering said plurality of transactions utilizing a second filter to pass only a second plurality of said plurality of transactions to a counter array.

16. The system according to claim 15, wherein said means for each of said plurality of nodes filtering said plurality of transactions utilizing a first filter to pass only a first plurality of said plurality of transactions to a first counter, further comprises:

means within each of said plurality of nodes, for determining if one of said plurality of transactions executes a local memory access with respect to said each of said plurality of nodes; and means responsive to a determination that said one of said plurality of transactions executes a local memory access with respect to said each of said plurality of nodes, for said first filter passing said one of said plurality of transactions to said first counter.

17. The system according to claim 16, wherein said means for each of said plurality of nodes filtering said plurality of transactions utilizing a second filter to pass only a second plurality of said plurality of transactions to a counter array, further comprises:

means within each of said plurality of nodes, for determining if one of said plurality of transactions executes a remote memory access with respect to said each of said plurality of nodes; and means responsive to a determination that said one of said one of said plurality of transactions executes a remote memory access with respect to said each of said plurality of nodes, for said second filter passing said one of said plurality of transactions to said second counter.

18. The system according to claim 17, further comprising means responsive to said first filter passing said one of said plurality of transactions to said first counter, for incrementing said first counter.

* * * * *